United States Patent [19]
de Smedt et al.

[11] Patent Number: 5,352,766
[45] Date of Patent: Oct. 4, 1994

[54] PREPARATION OF COPOLYMERS

[75] Inventors: Philip J. M. M. de Smedt; Jan H. Mulder; Herman M. Muijs, all of Amsterdam, Netherlands

[73] Assignee: Shell Oil Company, Houston, Tex.

[21] Appl. No.: 169,090

[22] Filed: Dec. 17, 1993

[30] Foreign Application Priority Data

Dec. 31, 1992 [EP] European Pat. Off. ........... 92204117

[51] Int. Cl.⁵ ............................................. C08G 73/02
[52] U.S. Cl. ................................................... 528/392
[58] Field of Search ......................................... 528/392

[56] References Cited

U.S. PATENT DOCUMENTS

| | | | |
|---|---|---|---|
| 4,503,217 | 3/1985 | Alexander et al. | 528/392 |
| 4,849,496 | 7/1989 | Watanabe et al. | 528/392 |
| 5,130,369 | 7/1992 | Hughes et al. | 528/392 |

FOREIGN PATENT DOCUMENTS

| | | |
|---|---|---|
| 305011 | 8/1988 | European Pat. Off. |
| 336459 | 2/1989 | European Pat. Off. |
| 339744 | 4/1989 | European Pat. Off. |
| 448177 | 3/1991 | European Pat. Off. |
| 460743 | 5/1991 | European Pat. Off. |

OTHER PUBLICATIONS

Search Report of 29 Mar. 1994.

*Primary Examiner*—Nathan M. Nutter
*Assistant Examiner*—Shelley A. Dodson
*Attorney, Agent, or Firm*—James O. Okorafor

[57] ABSTRACT

It is herein disclosed process for the preparation of copolymers of carbon monoxide and one or more ethylenically unsaturated compounds by reacting the monomers under polymerization conditions in the presence of a catalyst system based on a) a source of cations of one or more metals of Group VIII of the Periodic Table, and b) a source of anions, in the further presence of a diluent in which the copolymers are insoluble or virtually insoluble and of a minor amount of one or more non-ionic surfactant.

20 Claims, No Drawings

PREPARATION OF COPOLYMERS

BACKGROUND OF THE INVENTION

The invention relates to a process for the preparation of copolymers of carbon monoxide and one or more ethylenically unsaturated compounds.

Linear copolymers of carbon monoxide with one or more ethylenically unsaturated compounds, in which copolymers the units originating from carbon monoxide on the one hand and the units originating from the ethylenically unsaturated compound(s) used on the other hand occur in a substantially alternating arrangement, can be prepared by contacting the monomers at an elevated temperature and pressure, in the presence of a diluent in which the copolymers are insoluble or virtually insoluble, with a suitable catalyst. The preparation of the copolymers can, in principle, be carried out by employing either a batchwise or continuous process.

Batchwise preparation of the copolymers is generally carried out by introducing the suitable catalyst into a reactor containing diluent and monomers and which is at the desired temperature and pressure. As polymerization proceeds, the pressure drops, the concentration of the copolymers in the diluent increases and the viscosity of the suspension rises.

The reaction is discontinued when the viscosity becomes very high because of severe agglomeration of copolymer particles and continuing further could create difficulties in view of poor heat transfer in the suspension and stirring problems.

In principle, the only parameter which remains constant in batchwise copolymer preparation is the temperature. A variant of batchwise copolymer preparation is semi-batchwise preparation in which besides the temperature the pressure is also kept constant by adding monomers to the reactor during the polymerization.

In continuous copolymer preparation, a diluent, monomers and catalyst are continuously added to a reactor containing monomers and a certain volume of the diluent and which is at the desired temperature and pressure and a copolymer suspension is continuously withdrawn from it. During the continuous copolymer preparation, the temperature, the pressure and the liquid volume in the reactor are kept substantially constant. After a start-up period in which the copolymer concentration in the suspension increases to the desired value, a stationary state is reached which is characterized, inter alia, by the suspension which is withdrawn from the reactor having a substantially constant copolymer content and the copolymers contained therein having substantially constant properties.

One of the important properties of the copolymers in question is the bulk density. This plays an important role both in the preparation, treatment, storage, transport and processing of the copolymers. As far as copolymer preparation is concerned, the rule of thumb is that the maximum permissible suspension concentration, expressed in (kg copolymer/kg suspension)×100, is about one tenth of the bulk density expressed in $kg/m^3$. This means that in the preparation of a copolymer with a bulk density of 100 $kg/m^3$, the maximum suspension concentration is about 10%, whereas in the preparation of a copolymer with a bulk density of 200 $kg/m^3$, the maximum suspension concentration is about 20%. Therefore, a doubling of bulk density offers the possibility of preparing about twice the quantity of copolymer in the same reactor volume. Regarding copolymer treatment, such as filtering, washing and drying, is concerned, the quantity of adhering liquid is largely determined by the copolymer bulk density. Thus it has been found, for example, that a copolymer with a bulk density of 100 $kg/m^3$ binds approximately 5 kg diluent or washing liquid per kg, whereas to a copolymer with a bulk density of 200 $kg/m^3$ considerably less liquid is bound. This is naturally of great importance because of the quantity of liquid that must be used in washing the copolymers and must be removed when the copolymers are dried. Regarding transport and storage, the rule is that the higher the copolymers' bulk density, the more attractive the flow behavior they will have and the less space they will occupy. As regards the processing of the copolymers into shaped objects, it is often the case that copolymers with low bulk density cause problems in the processing apparatus. For copolymers with low bulk density of below 250 $kg/m^3$ a compacting treatment for example by extrusion, in order to make them suitable for further processing in the usual equipment for that purpose could become a problem. The higher the copolymers' bulk density, the easier the prior treatment, particularly extrusion, of the material.

It will be clear from the above that the main interest is in a process whereby a relatively high suspension concentration is achieved and whereby copolymers having a high bulk density are produced. However, a complication is formed by the previously mentioned agglomeration of copolymer particles, which may occur, before the suspension concentration has reached a value required for obtaining copolymers in an adequate yield.

An investigation of this phenomenon has revealed that the moment of severe agglomeration can be somewhat postponed by increasing the amount of catalyst used. However, when operating the process on a commercial scale, for economic reasons, the use of large quantities of catalyst is undesirable.

SUMMARY OF THE INVENTION

Surprisingly it has now been found that agglomeration of copolymer particles is delayed until an adequate suspension concentration has been reached, by performing the process in the presence of minor amounts of surface active compounds.

The invention may be defined as relating to a process for the preparation of copolymers of carbon monoxide and one or more ethylenically unsaturated compounds by reacting the monomers under polymerization conditions in the presence of a catalyst system comprising:

a) a source of cations of one or more metals of Group VIII of the Periodic Table, and b) a source of anions, in the further presence of a diluent in which the copolymers are insoluble or virtually insoluble and of a minor amount of one or more non-ionic surfactants.

Unlike other surfactants, those useful in the practice of this invention result in delay in agglomeration of copolymer particles, and do not substantially adversely affect the rate of polymerization or the properties of the copolymers inclusive of heat stability.

DETAILED DESCRIPTION OF THE INVENTION

The metals of Group VIII of the Periodic Table include the noble metals such as palladium, rhodium, osmium, ruthenium, iridium and platinum and the metals of the iron group such as iron, cobalt and nickel. Of these, palladium, nickel and cobalt are preferred. Palladium is the most preferred Group VIII metal.

As source of cations of one or more of these metals conveniently a salt of the metal(s) selected is used. Suitable salts include salts of mineral acids such as sulfuric acid, nitric acid and phosphoric acid and of sulfonic acids such as methane sulfonic acid, trifluoromethanesulfonic acid and paratoluenesulfonic acid. Other suitable salts include salts of carboxylic acids, such as acetic acid, trifluoroacetic acid, propionic acid and citric acid.

Furthermore, as a source of cations use may be made of the metals in their elemental form, or in a zero-valent state, e.g. in complex form. Usually these sources are applied together with a protic acid, so that the metal cations are formed in situ.

The source of anions (component b) on which the catalyst system of the invention is based, is conveniently an acid or salt thereof. As suitable acids, the acids disclosed in connection with the Group VIII metal salts are herein incorporated. Preferred anion sources are acids having a pKa value (measured at 18° C. in aqueous solution) of less than 4, particularly of less than 2.

Preferred examples of anion sources are trifluoroacetic acid and p-toluenesulfonic acid, perchloric acid and tetrafluoroboric acid.

Advantageously, the catalyst systems of the invention comprise, in addition to components (a) and (b), a stabilizing ligand, containing one or more sites which can form a complexing bond with a metal of Group VIII. Thus the ligands may be monodentate, bidentate or even tridentate. Bidentate ligands containing two sites forming complexing bonds with a Group VIII metal are preferred. Particularly preferred are bidentate ligands of the formula

$$R^1 R^2 M^1 R M^2 R^3 R^4 \qquad (I)$$

wherein $R^1$, $R^2$, $R^3$ and $R^4$ independently represent optionally substituted hydrocarbyl groups, R represents a bivalent bridging group having from 1 to 5 atoms in the bridge and $M^1$ and $M^2$ represent the same or different atoms selected from phosphorus, arsenic, antimony or nitrogen atoms.

Preferably $M^1$ and $M^2$ both represent phosphorus atoms. R represents preferably a bivalent organic bridging group containing at least two carbon atoms in the bridge, in particular three carbon atoms.

The optionally substituted hydrocarbyl groups $R^1$, $R^2$, $R^3$ and $R^4$ may be aryl, alkyl, alkaryl, aralkyl or cycloalkyl groups. Preferably they represent aryl groups and in particular aryl groups substituted by one or more polar groups such as alkoxy, alkylamino, dialkylamino groups or halogen atoms. Most preferred are phenyl groups wherein one or both ortho positions with respect to $M^1$ or $M^2$, are substituted with an alkoxy-group, preferably a methoxy group.

Examples of suitable monodentate ligands may be indicated by the formula $M^3 R^1 R^2 R^3$ wherein $M^3$ represents a phosphorus, arsenic or antimony atom and $R^1$, $R^2$ and $R^3$ have the previously disclosed meaning.

The amount of catalyst used in the process of the invention may vary considerably. Advantageously an amount is applied in the range of from $10^{-7}$ to $10^{-1}$ gram atom of Group VIII metal(s) per mole of ethylenically unsaturated compound to be polymerized. Preferably the amount is in the range of from $10^{-6}$ to $10^{-2}$ on the same basis.

The copolymers of the invention are insoluble or at least virtually insoluble in many conventional liquid solvents and accordingly a large number of these liquids may serve as diluent in the process of the invention.

Recommended diluents are polar organic liquids, such as ketones, ethers, esters or amides. Preferably a protic liquid is used such as monohydric or dihydric alcohols. Lower monohydric alcohols such as methanol, ethanol, and butanol-1 are the preferred diluents. Methanol is particularly preferred.

Without wishing to be bound by any theory, it is believed that the surfactant(s) present in the process of the invention contribute to the sterical stability of the suspension. Conceivably, the surface area of copolymer particles in the suspension is at least partly covered by surfactant molecules, which delays the agglomeration of the copolymer particles until the suspension concentration has reached a value, significantly higher than would have been reached in the absence of surfactant(s).

The surfactants suitable in the practice of this invention are non-ionic surfactants selected from alcoholalkoxylates and polymers of a vinyl amide monomer. Typically, the alcoholalkoxylates are conceivably derived from 1,2-alkylene oxides, in particular ether oxide or 1,2-propene oxide, and from monohydric alkanols or alkyl-substituted phenols comprising an aromatic system of one or more rings, typically one ring, the monohydric alkanols and the alkyl-substituted phenols have typically from 7 to 25 carbon atoms. A preferred category of surfactants may be defined by the formula

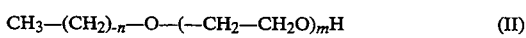

$$CH_3-(CH_2)_n-O-(-CH_2-CH_2O)_mH \qquad (II)$$

wherein n is an integer in the range of 8 to 18 and m is an integer in the range of 1 to 6.

Members of this category comprise a non polar moiety conceivably derived from linear alkenes and a polar moiety conceivably derived from one or more ethyleneoxide groups.

Preferably the non-polar moiety comprises from 12 to 15 carbon atoms. The number of ethoxy groups involved in the polar moiety is preferably between 2 and 4, particularly 3.

Many of these compounds are commercially available surfactants such as DOBANOL ®25-3.

Other preferred non-ionic surfactants are alkylphenolalkoxylates such as nonylphenolethoxylate—10 EO (etheneoxide) and nonyl-phenolethoxylate—20 EO, surfactants containing a branched non polar moiety and a polar moiety derived, for example, from a number of ethylene-oxide groups.

Examples of the polymers of a vinyl amide monomer are polyacrylamide, polymethacrylamide, and polyvinylpyrrolidone, the latter being a preferred surfactant. The polymers of a vinyl amide monomer have typically a number average molecular weight in the range of from $5 \times 10^3$ to $10^6$, more typically in the range of from $5 \times 10^3$ to $10^5$. Very good results can be obtained with commercially available polyvinylpyrrolidone having a number average molecular weight of about 10,000.

In the process of the invention only minor amounts of surfactants are used. Generally the amount is well below 20 g per liter of reaction mixture. In most cases, it is below 10 g on the same basis. Preferred amounts are in the range of from 0.7 to 5 g per liter of reaction mixture.

The surfactant(s) may be supplied to the reactor before the copolymerization reaction starts, or during the reaction. If surfactants are supplied before, or at an early stage of the reaction, it is recommended to supply only a small portion of the total amount of surfactants intended to be used. It is preferred to supply the surfactants during the process in equal, small increments or continuously to the reactor.

Ethylenically unsaturated compounds suitable to be used as starting material include unsaturated compounds consisting exclusively of carbon and hydrogen and compounds comprising in addition one or more hetero-atoms, such as oxygen or nitrogen atoms. Examples are unsaturated esters, such as methylacrylate and vinylacetate. Unsaturated hydrocarbons are preferred. Suitable examples are the lower olefins, such as ethene, propene and 1-butene, cyclic olefins such as cyclopentene and aryl-substituted olefins such as styrene. Ethene and mixtures of ethene and propene are particularly preferred starting materials.

The molar ratio between the monomer reactants, viz. on the one hand carbon monoxide and on the other hand the ethylenically unsaturated compound(s) is advantageously selected in the range of from 5:1 to 1:5, preferably in the range of from 1.5:1 to 1:1.5, substantially equimolar amounts being most preferred.

The reaction is generally performed at temperatures in the range of from 20°–180° C. and at pressures in the range of from 2–150 bar. Preferred reaction temperatures are in the range of from 30°–150° C. and preferred pressures are selected in the range of from 20 to 100 bar.

The copolymers prepared according to the invention have established utility in various outlets for thermoplastics. They may be processed by means of conventional techniques into films, sheets, plates, fibers, shaped articles such as containers for food and drinks and parts for the car industry.

The invention is further illustrated by the following non-limiting examples.

EXAMPLE 1

A carbon monoxide/ethene copolymer was prepared as follows:

An autoclave with a capacity of 3.78 L and equipped with a mechanical stirrer with 2 baffles, operated at 600 rpm, was charged with 1500 mL of methanol.

The air present in the autoclave was removed by pressurizing the autoclave with carbon monoxide to 15 bars and then releasing the pressure. This procedure was repeated twice. Under stirring, the contents of the autoclave were brought to a temperature of 86° C. and a 2:1 mixture of carbon monoxide and ethene was supplied until the pressure was 25 bars. Subsequently, a catalyst solution consisting of 0.013 mmol palladium (II) trifluoroacetate (1.4 mg palladium), 0014 mmol 1,3-bis[-di(2-methoxyphenyl)-phosphino] propane and 0.18 mmol trifluoroacetate (TFA) was introduced.

During the reaction period the temperature and pressure were kept constant. After seven run hours, 3 g of a surfactant, sold under the trademark of DOBANOL 25-3, a condensation product of a mixture of n-alkanols with 12 to 15 carbon atoms and on average 3 mol ethene oxide per mol alkanol, was added.

As soon as agglomeration occurred, the formed suspension became stagnant and the process was discontinued.

The contents of the autoclave were cooled to ambient temperature and the pressure was released.

The results, as regards LVN, reaction period, suspension concentration and bulk density at agglomeration, are shown in Table I.

EXAMPLE 2

A carbon monoxide/ethene copolymer was prepared, substantially as described in Example 1, with the difference that as surfactant, 3 g of nonylphenolethoxylate 10 EO(ethene oxide) was added, instead of DOBANOL 25-3. The results are also shown in Table I.

EXAMPLE 3

A carbon monoxide/ethene copolymer was prepared, substantially as described in Example 1, with the difference that as surfactant, 3 g of nonylphenolethoxylate 20 EO was added, instead of DOBANOL 25-3. The results are shown in Table I.

EXAMPLE 4

A carbon monoxide/ethene copolymer was prepared, substantially as described in Example 1, with the difference that after 5, 6 and 27 run hours, respectively, portions of 0.5 g of polyvinylpyrrolidone were added as surfactant, instead of DOBANOL 25-3. The results are shown in Table I.

EXAMPLE A (for comparison)

A carbon monoxide/ethene copolymer was prepared, substantially as described in Example 1, with the difference that no surfactant was added. The results are shown in Table I.

EXAMPLE B (for comparison)

A carbon monoxide/ethene co-polymer was prepared, substantially as described in Example 1, with the difference that as surfactant 3 g of coconut fatty acid diethanolamide (C DEA) was added, instead of DOBANOL 25-3. After the addition of surfactant complete deactivation of the catalyst was observed, whereupon the process was discontinued. Further details are shown in Table I.

EXAMPLE C (for comparison)

A carbon monoxide/ethene co-polymer was prepared, substantially as described in Example 1, with the difference that after 5, 6, and 7 run hours, respectively, portions of 0.5 g of a block copolymer of 90% wt propylene glycol and 10% wt ethylene glycol (PO EO) were added as surfactant. The results are shown in Table I.

EXAMPLE D (for comparison)

A carbon monoxide/ethene co-polymer was prepared, substantially as described in Example 1, with the difference that no surfactant was added. The results are shown in Table I.

EXAMPLE E (for comparison)

A carbon monoxide/ethene copolymer was prepared, substantially as described in Example A, with the difference that the amount of trifluoroacetic acid was 0.11 mmol, instead of 0.18 mmol. The results are shown in Table I.

EXAMPLE F (for comparison)

A carbon monoxide/ethene copolymer was prepared, substantially as described in Example A, with the difference that the amount of palladium was 0.7 mg, instead of 1.4 mg and the amount of trifluoroacetic acid was 0.11 mmol, instead of 0.18 mmol. The results are shown in Table I.

TABLE I

| Ex. | Surfactant | Total Quantity (g) | at run h. | Pd (mg) | TFA/Pd (Mol/Mol) | Susp. conc. (% w on MeOH) | bulkdens (kg/m³) | rate (kg/g · h) | LVN (de/g) |
| --- | --- | --- | --- | --- | --- | --- | --- | --- | --- |
| 1 | DOB 25-3 | 3 | 7 | 1.4 | 14 | 11.5 | 200 | 3.0 | 0.86 |
| 2 | N Ph 10EO | 3 | 7 | 1.4 | 14 | 8.3 | 150 | 5.0 | 0.94 |
| 3 | N Ph 20EO | 3 | 7 | 1.4 | 14 | 8.3 | 150 | 4.4 | 1.15 |
| 4 | PVP | 1,5 | 5, 6, 27 | 1.4 | 14 | 10.2 | 120 | 2.6 | 1.06 |
| A | TA DEA | 3 | 7 | 1.4 | 14 | 1) | — | — | — |
| B | C DEA | 3 | 7 | 1.4 | 14 | 1) | — | — | — |
| C | PO EO | 1.5 | 5, 6, 7 | 1.4 | 14 | 6.4 | 60 | 5.3 | 2) |
| D | — | — | — | 1.4 | 14 | 6.4 | 140 | 4.6 | 1.15 |
| E | — | — | — | 1.4 | 8 | 9.7 | 130 | 3.6 | 1 |
| F | — | — | — | 0.7 | 14 | 5.3 | 80 | 5.6 | 1.15 |

TFA = trifluoroacetic acid
DOB 25-3 = DOBANOL 25-3 ethoxylate
NPh 10EO = nonylphenolethoxylate 10 EO
NPh 20EO = nonylphenolethoxylate 20 EO
PVP = polyvinylpyrrolidone
TA DEA = tallow acid diethanolamide
C DEA = coconut fatty acid diethanolamide
(PO EO) = block copolymer of 90% wt propylene glycol and 10% wt ethylene glycol
LVN = Limiting viscosity number, the intrinsic viscosity, calculated from determined viscosity values, measured for different copolymer concentrations in m-cresol at 60° C.
1) catalyst deactivation observed upon addition of surfactant
2) not determined.

While this invention has been described in detail for the purpose of illustration, it is not to be construed as limited thereby but is intended to cover all changes and modifications within the spirit and scope thereof.

What is claimed is:

1. A process for the preparation of copolymers of carbon monoxide and one or more ethylenically unsaturated compounds by reacting the monomers under polymerization conditions in the presence of a catalyst system comprising:

a) a source of cations of one or more metals of Group VIII of the Periodic Table, and
   b) a source of anions, in the further presence of a diluent in which the copolymers are insoluble or virtually insoluble and of a minor amount of one or more non-ionic surfactants.

2. A process as in claim 1 wherein said metal is selected from the group consisting of cobalt, nickel, or palladium.

3. A process as in claim 2 wherein said metal is palladium.

4. A process as in claim 1 wherein (b) is an acid or salt thereof with a pKa of less than 4.

5. A process as in claim 4 wherein said acid or salt thereof has a pKa of less than 2.

6. A process as in claim 1 wherein said surfactant is non-ionic.

7. A process as in claim 1 wherein said surfactant is represented by the formula

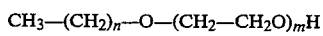

CH$_3$—(CH$_2$)$_n$—O—(CH$_2$—CH$_2$O)$_m$H wherein n is an integer in the range of from 8 to 18, and m is an integer in the range of from 1 to 6.

8. A process as in claim 7 wherein n is an integer in the range of from 11 to 14, and m is 3.

9. A process as in claim 1 wherein said surfactant is present in an amount of less than 20 g/l of reaction mixture.

10. A process as in claim 9 wherein said surfactant is present in an amount within the range of from 0.7 to 5 g/l of reaction mixture.

11. A process as in claim 1 wherein said surfactant is added continuously during said preparation of copolymers.

12. A copolymer prepared by the process of claim 1.

13. An article of manufacture prepared from the copolymer of claim 1.

14. A process as in claim 1 wherein said catalyst system further comprises a stabilizing ligand.

15. A process as in claim 1 wherein said diluent is an organic protic liquid.

16. A process as in claim 15 wherein said diluent is a lower alcohol.

17. A process as in claim 16 wherein said alcohol is methanol.

18. A process as in claim 1 wherein said surfactant is a member of the group consisting of alkoxylates of a monohydric alcohol or polymers of a vinyl amide monomer.

19. A process as in claim 18 wherein said vinyl amide monomer is poly(vinylpyrrolidine).

20. A process as in claim 19 wherein said poly(vinylpyrrolidine) has a number average molecular weight of from $5 \times 10^3$ to $10^5$.

* * * * *